April 5, 1966     G. P. MILLER ETAL     3,244,893
PHOTOMULTIPLIER POSITIONING MECHANISM
Filed Aug. 6, 1962     3 Sheets-Sheet 1

GEORGE P. MILLER
JAMES G. SOUSOURES
INVENTORS

BY Fraser and Bogucki

ATTORNEYS

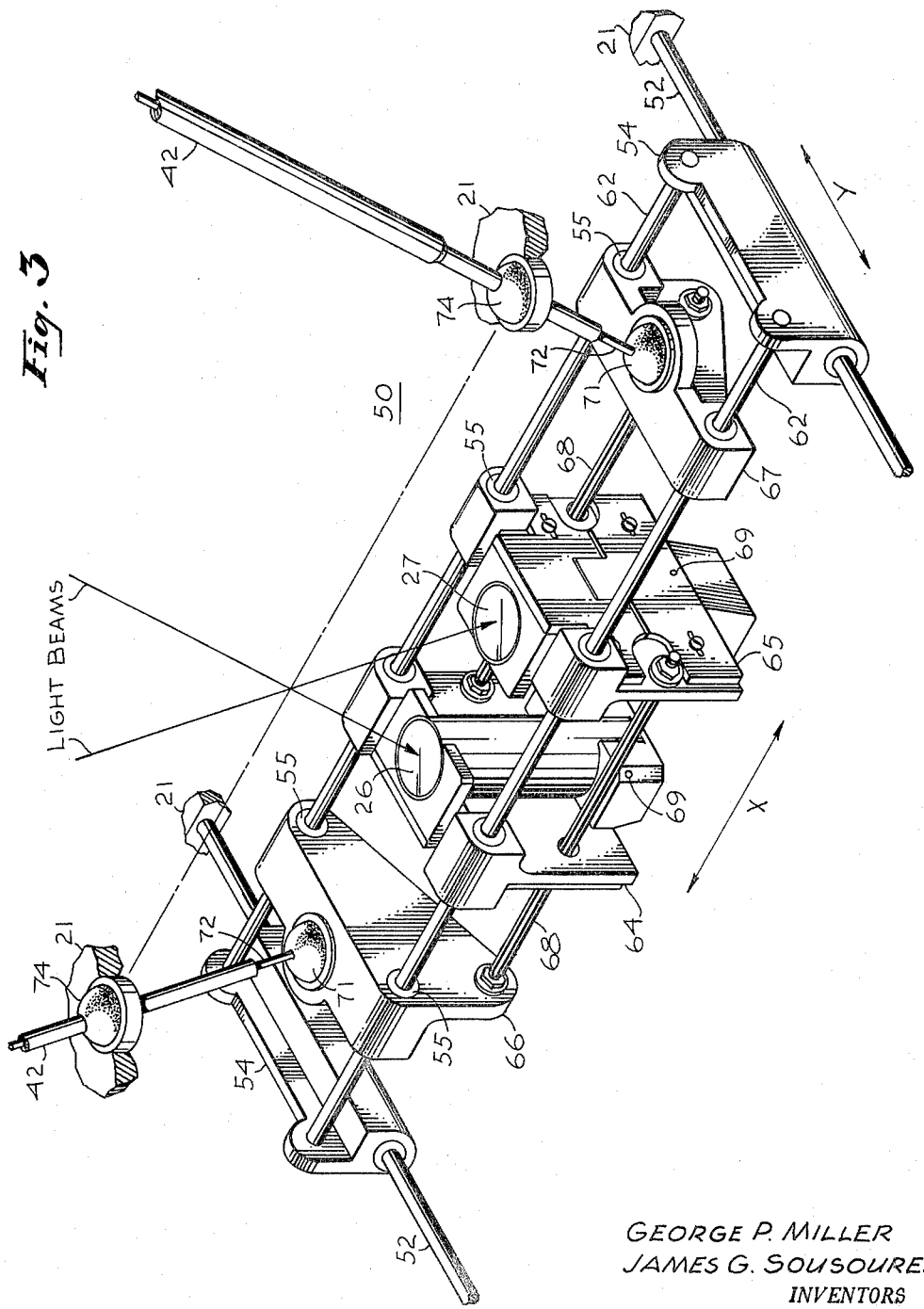

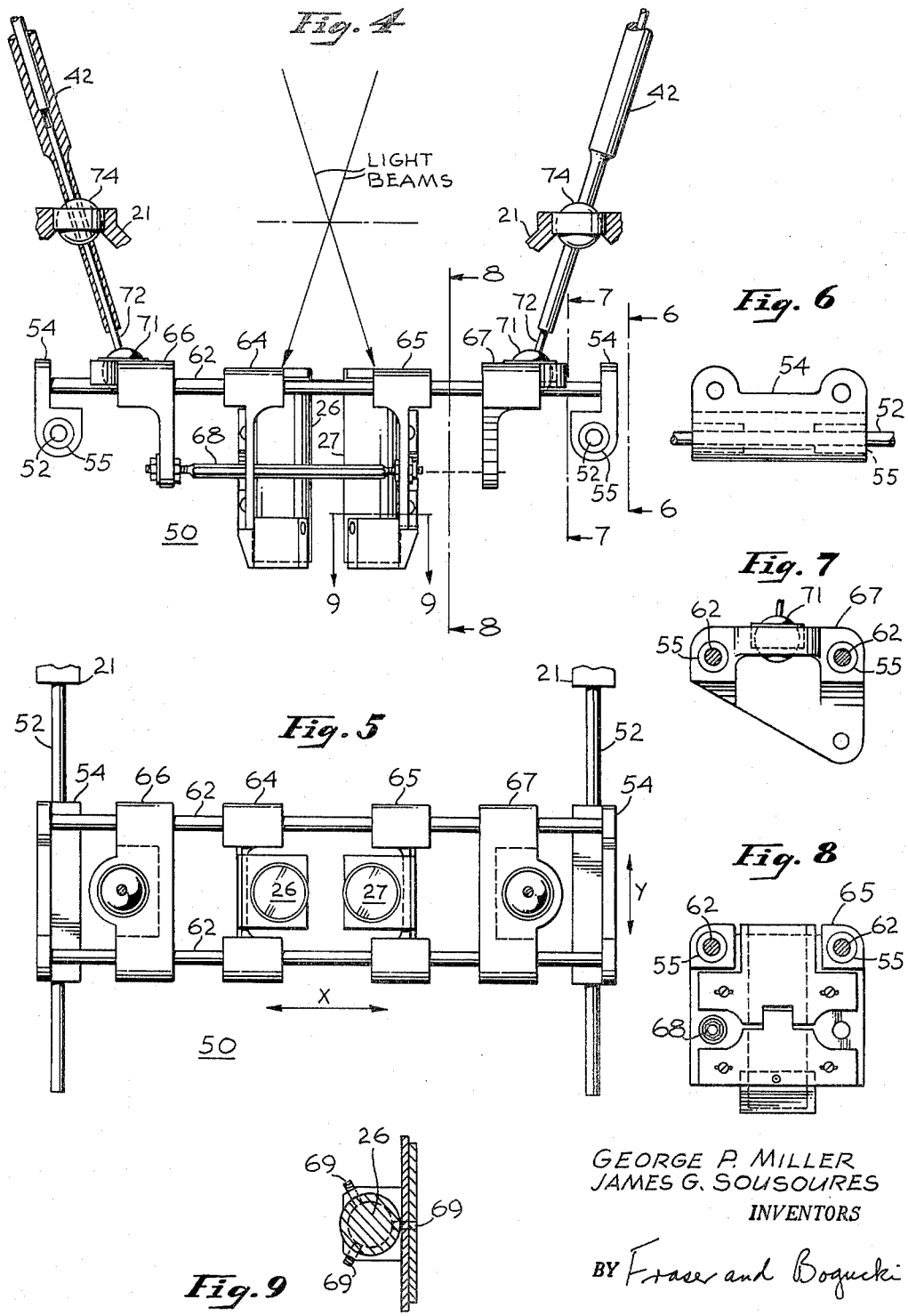

United States Patent Office 3,244,893
Patented Apr. 5, 1966

3,244,893
PHOTOMULTIPLIER POSITIONING
MECHANISM
George P. Miller and James G. Sousoures, Los Angeles, Calif., assignors, by mesne assignments, to The Bunker-Ramo Corporation, Stamford, Conn., a corporation of Delaware
Filed Aug. 6, 1962, Ser. No. 215,040
11 Claims. (Cl. 250—220)

This invention relates to positioning mechanisms and more particularly to an arrangement for positioning a pair of photomultiplier tubes in a scanning mechanism as the latter is moved over a particular traverse in a stereomapping system.

One application in which the present invention may be employed is in an automatic stereomapping system used to develop an orthographic photomap and a comparative elevation chart of a particular area from a pair of stereoscopic photographs, such as may be obtained from an aircraft flying over the area. In one particular arrangement employed in the automatic stereomapping system, a pair of stereoscopic diapositives, or photographic transparencies, are placed in a modified Kelsh plotter and suitably aligned to correspond on a reduced scale to the relative positions of the camera taking the photographs. Light is directed independently through the two diapositives to produce a stereoscopic image of the terrain being mapped and a Nipkow scanning disk is utilized as a test surface and made to traverse the projected image in regular fashion so as to generate electrical signals representative of the photographic and topographical features of the image. A pair of spatially separated photomultiplier tubes is employed to produce the respective electrical signals from light which is passed through the scanning mechanism as the Nipkow disk is moved over the image. The separate electrical signals are correlated to develop error signals which are used to control the elevation and angle of tilt of the Nipkow scanner as it traverses the projected image. As a result, the system is enabled to produce a drop-line chart indicating the relative elevation of each point in the scanned image in addition to the development of an orthographic photomap.

In the operation of the automatic stereomapping system, light from associated projectors is directed at each of the photomultiplier tubes through an extremely small aperture in the Nipkow disk. Because of the motion of the Nipkow scanner in the horizontal plane over the considerable extent of the projected image, it is virtually impossible to place the two photomultiplier tubes in fixed positions so that each tube receives the light signals corresponding to any particular portion of the projected image being scanned at any given instant. This problem is further complicated by the fact that the entire scanning mechanism moves up and down to follow the projected stereoscopic image and the scanning disk may be tilted to follow the slope of the actual terrain image.

The relative phase displacement of the electrical signals generated by two the photomultiplier tubes is employed to control the elevation and tilt of the Nipkow scanner. In order that the proper elevation of the Nipkow scanner corresponding to any particular point in the projected stereoscopic image may be ascertained with sufficient precision, it is essential that there be no interruption or loss of the light signals by virtue of improper positioning of the photomultiplier tubes. The respective photomultiplier tubes must be very precisely positioned to follow the light beams passed by the Nipkow scanner as the latter moves up and down and across the field of the projected stereo image.

Previous stereoscopic projection arrangements of the Kelsh plotter type have included mechanisms for varying the angles of the incident light received through the respective diapositives as a test surface is moved over the projected image. However, no previously known arrangement provides for the proper positioning of a pair of photomultiplier tubes utilized in conjunction with an automatic stereoscopic scanning arrangement in a manner which properly positions the respective photomultiplier tubes at every point over the extent of the image being scanned and in a way which takes into account the elevation as well as the horizontal displacement of the scanner.

It is therefore an object of the invention to provide a mechanism for controlling the positions of a pair of photomultiplier tubes utilized in a stereomapping system.

It is also an object of this invention to control the positions of a pair of photomultiplier tubes utilized in conjunction with a movable scanner in an automatic stereomapping system so that the appropriate light signals are received by the photomultiplier tubes regardless of the position of the scanner.

More particularly it is an object of the invention to maintain each of a pair of photomultiplier tubes employed in conjunction with the scanner of an automatic stereomapping system so that each of the photomultiplier tubes is maintained in a direct line with the light transmitted from a selected portion of a corresponding diapositive.

It is a specific object of this invention to move a pair of photomultiplier tubes in response to movement of an associated scanning mechanism in a stereomapping system so that each photomultiplier tube receives light from a selected portion of a corresponding diapositive while maintaining a fixed distance between the scanning mechanism and the photomultiplier tubes.

Briefly considered, arrangements in accordance with the present invention comprise a carriage which is movable in any of three orthogonal directions and a pair of pivot members separate from the carriage which are arranged to pivot about separate pivot points as the carriage is moved so as to always be directed at a particular point on the carriage. Thus it may be considered that the extensions of the center lines of the pivot members always intersect at this point on the carriage. On the side of this point of intersection remote from the pivot members, a pair of elements are positioned which are to be maintained respectively positioned along the two extensions of the center lines of the pivot members regardless of the position of the carriage. Furthermore, these two elements are maintained in a plane which is a fixed distance from the point of intersection of the extended center lines. Telescoping linkage members and ball and socket joint connections are employed to translate the rotation of the pivot members to a translational motion of the particular elements so that the appropriate motion within the above-described constraints is maintained.

In one particular arrangement in accordance with the invention, the elements which are to be constrained in their movements are photomultiplier tubes utilized as part of a scanning mechanism in the apparatus of an automatic stereomapping system as described in the above-cited copending patent application. The scanning mechanism is part of a modified Kelsh plotter and is movable in the X, Y and Z Cartesian coordinate directions over the bed of the plotter. A pair of pivot members are provided as part of the Kelsh plotter and are employed to support independent light sources so that light therefrom, after passing through the respective diapositives, may pass through the hollow pivot members to intersect at an aperture of the Nipkow scanning disk. A pair of photomultiplier tubes are positioned below the scanning disk so as to receive light from the respective light sources. Two sets of guide rails are provided within the carriage for transporting the photomultiplier tubes. The first set of guide rails is aligned in the Y direction and is arranged to support a pair of end brackets in which the remaining guide rails are mounted aligned in the X direction. Extendable linkage members connect the pivot members respectively to the carriage and to a pair of slides which are movable along the X guide rails. The photomultiplier tubes are mounted on these slides so that they may be moved along the X guide rails in accordance with the X axis motion of the carriage and the corresponding rotation of the pivot members. This same arrangement serves to move the entire photomultiplier mounting mechanism along the Y axis guide rails as the scanner moves in the Y direction. In addition, the respective linkages serve to adjust the position of the photomultiplier tubes by appropriate amounts of the scanner moves vertically along the Z axis in order to take care of slight changes in the angle of the pivot members with respect to each other. Thus the photomultiplier tubes are always maintained in the proper position to receive the light beams from respective light sources, regardless of the position of the scanner carriage in its traverse of the field of the projected image.

While the photomultiplier tubes might have been maintained in the appropriate relationship to receive the light from the respective light sources by having them suspended from arms attached to the respective pivot members, somewhat in the manner by which the light sources are suspended therefrom and are arranged to rotate with the pivot members, such an arrangement would be extremely cumbersome and would undesirably limit the permissable travel of the scanner, particularly in the vertical direction. The photomultiplier tubes must be positioned below the Nipkow scanning disk and enclosed within the scanner housing in order to prevent extraneous light from adversely affecting their operation. A much larger housing would have been necessary in order to use such an arrangement for this purpose and this would have militated against the design objectives of providing a scanner which is as light and as free in its movement as possible in order to reduce the power requirements of the scanner control circuitry.

A particular arrangement of the present invention maintains the photomultiplier tubes at a fixed distance below the aperture of the Nipkow scanning disk, regardless of the X-Y coordinate position of the scanner, so that the scanner may be brought much closer to the bed of the modified Kelsh plotter than would be possible with the alternative pivoted arrangement. In addition, the associated mounting members of the photomultiplier positioning mechanism of the invention are made as light as possible and friction is virtually eliminated by the use of ball bearings wherever sliding or rotary motion is involved.

A better understanding of the invention may be gained from a consideration of the following detailed description, taken in conjunction with the accompanying drawings, in which:

FIG. 3 is an expanded view in perspective showing significant portions of one particular arrangement in accordance with the present invention as employed in the modified Kelsh plotter of FIG. 1;

FIG. 4 is a front view of the arrangement shown in FIG. 3;

FIG. 5 is a top view of the arrangement of FIG. 3;

FIG. 6 is an end view showing one particular member employed in the arrangement of FIG. 4;

FIG. 7 is an end view of another member employed in the arrangement of FIG. 4;

FIG. 8 is an end view of yet another member employed in the arrangement of FIG. 4; and FIG. 9 is a sectional view taken along the line 9—9 of FIG. 4.

Figure 1:
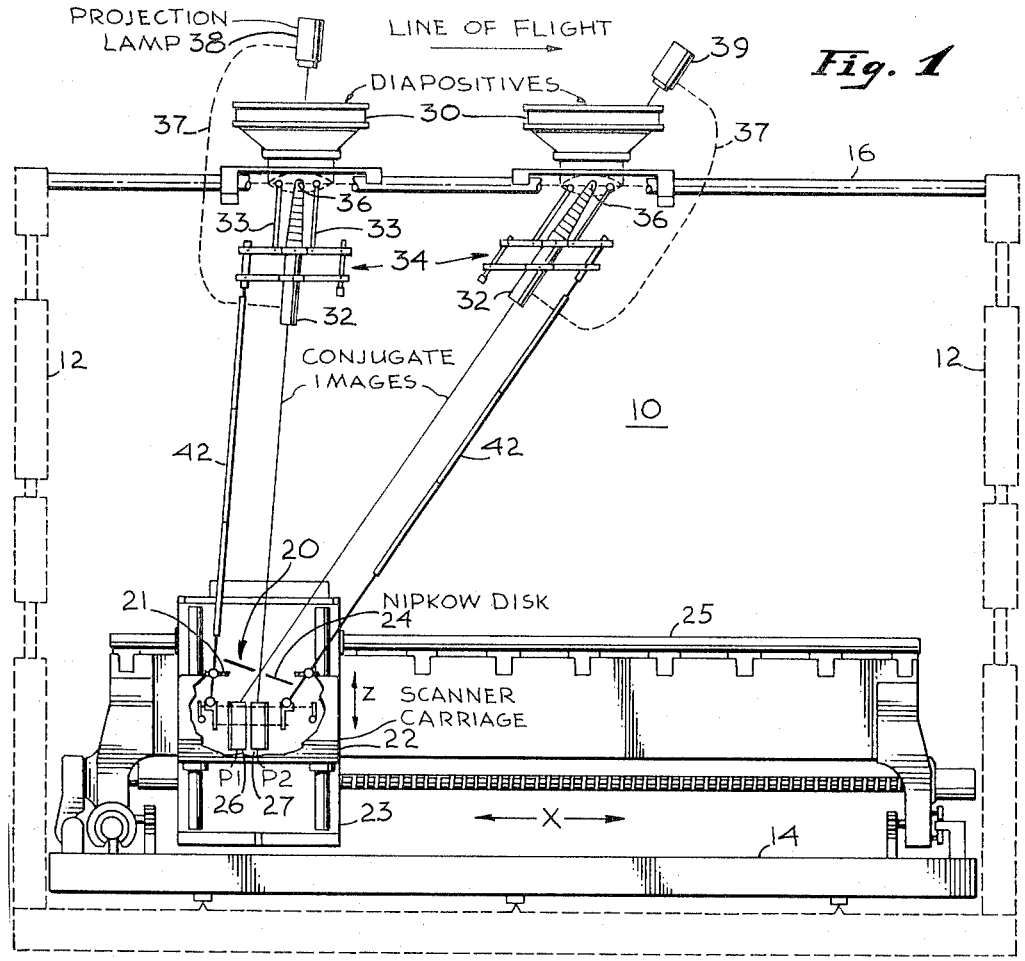
FIGURE 1 is a front elevational view representing the significant elements of a modified Kelsh plotter employed in the above-described automatic stereomapping system.
Figure 2:
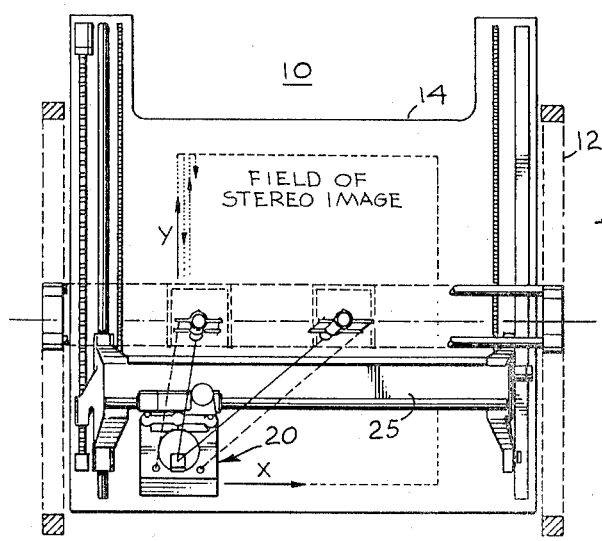
FIG. 2 is a plan view of the modified Kelsh plotter shown in FIG. 1.

A standard Kelsh photogrammetric plotter, suitably modified for automatic scanning of a projected stereoscopic image, is represented in FIGS. 1 and 2 which, for simplicity, show only the more significant elements of the plotter 10. The present invention may be utilized to advantage in the modified Kelsh plotter 10 in FIGS. 1 and 2 and particular portions of one specific arrangement in accordance with the invention are shown in these figures. In brief, the modified Kelsh plotter 10 includes upright frame members 12 attached to a bed 14 and supporting a horizontal crosspiece 16. A scanner 20 is shown suspended from a scanner carriage 22 which is movable vertically along an X carriage 23. In turn, the X carriage is suspended from and movable along a Y carriage 25 which itself is movable across the base 14. Thus the scanner 20 may be made to traverse the field of the projected stereo image in the X and Y coordinate directions and is also movable vertically in the Z coordinate direction.

A pair of mounting mechanisms 30 are affixed to the crosspiece 16 and arranged to receive a pair of diapositives which correspond to aerial photographs taken from an airplane flying in a prescribed line of flight over terrain which is to be mapped. A pair of pivot members 32 are respectively suspended from the crosspiece 16 by means of vertical support members 33 and a parallel bar linkage 34. The pivot members 32 are engaged at one end thereof in sockets or depressions of the crosspiece 16 so that the pivot members 32 may pivot about fixed points 36. A pair of light sources 38 and 39 are respectively suspended from the pivot members 32 by means of curved arms 37, indicated generally by the dashed lines.

In the operation of the modified Kelsh plotter shown in FIGS. 1 and 2, two diapositives are placed on the light focusing mechanisms 30 so that a stereoscopic image of particular terrain to be mapped is projected in the region above the bed 14. The scanner 20 is then moved back and forth in the Y axis direction and stepped successively in the X axis direction as indicated by the arrows shown in FIG. 2. As the scanner 20 is made to traverse the projected image in this manner, the image is scanned by means of a Nipkow scanning disk 24 which serves to admit light from the light sources 38, 39 through a narrow aperture to a pair of photomultiplier tubes 26 and 27. It should be particularly noted that the light from the right-hand light source 39 is incident upon the left-hand photomultiplier tube 26, while light from the left-hand light source 38 is directed to the right-hand photomultiplier tube 27. In response to signals developed by the photomultiplier tubes 26, 27, the scanner 20 is moved vertically in the Z axis direction to follow the contour of the projected stereoscopic image as the scanner 20 is made to traverse the field of the projected image. In this way the stereomapping system is able to develop information as to the actual elevation of each individual point in the terrain being mapped.

It will be appreciated that, for the effective operation of the system, the respective light beams from the sources 38, 39 proceed through corresponding portions of the diapositives positioned on the mounting mechanisms 30 and through the hollow pivot members 32 to insersect at the aperture of the Nipkow scanning disk 24. The respective light beams must then continue on to the photomultiplier tubes 26, 27. This particular relationship must be maintained regardless of the position of the scanner 20 in the modified Kelsh plotter 10. It will further be appreciated that the photomultiplier tubes 26 and 27 must also be moved in accordance with the direction of the respective light beams as the scanner 20 is moved about the plotter 10. In order that the extent of permissible vertical travel of the scanner 20 be not unduly limited, the photomultipliers 26 and 27 are arranged in accordance with an aspect of the invention to maintain a fixed distance from the aperture of the Nipkow scanning disk 24. Thus the scanner 20 may be moved down almost to the surface of the bed 14 if desired with a minimum clearance between the bed 14 and the lower ends of the photomultiplier tubes 26 and 27.

A telescoping linkage rod 42 is connected as an extension of a parallel bar linkage 34 to complete the mechanical connection between a hollow pivot member 32 and the frame 21 of the scanner carriage 22.

As shown in detail in FIGS. 3–5, a particular photomultiplier positioning mechanism in accordance with the invention comprises a photomultiplier positioning subassembly 50 arranged for movement within the scanner 20 along a pair of Y axis guide rails 52 which are affixed to the frame of the scanner 20. This movement is possible by virtue of a pair of end brackets 54 which are slidably positioned upon the Y axis guide rails by means of cylindrically shaped ball bushings 55. These ball bushings are, in effect, linear ball bearings which are, arranged to permit precise linear motion along the corresponding guide rails with a minimum of friction and back-lash while maintaining the desired alignment of elements. Each end bracket 54 (see FIG. 6) has a pair of holes drilled to receive, in rigid mounting configuration, the ends of a pair of X axis guide rails 62. A pair of photomultiplier slide members 64 and 65 and a pair of bearing slide members 66 and 67 are slidably mounted by means of additional ball bushings upon the X axis guide rails 62. The photomultiplier tubes 26 and 27 together with appropriate magnetic shields are positioned within recesses of the photomultiplier slide members 64 and 65 respectively and affixed in position by means of the adjustable mounting arrangement shown in FIG. 9 wherein the base of a photomultiplier tube such as 26 is gripped by means of three adjustable screws 69 which are threaded through the lower portion of each of the photomultiplier slides 64 and 65. In one particular arrangement of the invention the screws 69 are fabricated of nylon for insulation so that the photomultiplier tube shields may be maintained at a potential different from that of the positioning mechanism.

A fixed distance is maintained between the bearing slide 66 and the photomultiplier slide 65 by means of a translating member in the form of a spacing rod 68 which is affixed to the respective slides 65 and 66 by means of locking nuts threaded on opposite ends of the rod 68. A similar spacing rod 68 (FIG. 3) is attached between the photomultiplier slide 64 and the bearing slide 67 to maintain a similar spatial relationship. The spacing between the respective slides is variable to some extent, depending upon the degree to which the locking nuts are threaded onto the ends of the rods 68. The spacing may be adjusted when the mechanism is first set up for operation and thereafter need not be changed during normal use. One spacing rod 68 passes through an opening in the intervening photomultiplier slide 64 to permit the bearing slide 66 to control the position of the photomultiplier slide 65 along the X axis guide rails 62. Similarly, the spacing rod 68 extending between the photomultiplier slide 64 and the bearing slide 67 extends through an opening in the photomultiplier slide 65.

Details of the bearing slides 66 and 67 are shown in FIG. 7, while the photomultiplier slides 64 and 65 are shown in detail in FIG. 8. As shown in FIG. 7, the bearing slide 67 is shaped in the form of a trapezoid in order to reduce the weight and inertia of the mechanism as much as possible. The housing of a spherical ball bearing 71 is affixed to the bearing slide 67 and has a rod 72 extending upward therefrom. The rod 72 extends within the hollow central portion of the lower end of a telescoping linkage rod 42 which is affixed to a second spherical ball bearing 74 mounted in the frame 21 of the scanner carriage 22. Thus the spherical ball bearings 74 serve as fulcrum points for the telescoping linkage rods 42 which connect the pivot members 32 and the bearing slides 66, 67. By means of this arrangement, the scanner 20, during its movement along the X, Y and Z coordinate axes is traversing the field of the projected stereo image, is enabled to control the respective angles of the pivot members 32 and the positions of the respective photomultiplier tubes 26 and 27 while the tubes 26 and 27 are maintained at a selected distance below the aperture of the Nipkow scanning disk 24. During the movement thus described, the upper portions of the telescoping linkage rods 42 may extend or retract depending upon the distances involved between the connected elements. Similarly the rods 72 may move in and out of the lower portions of the telescoping linkage rods 42 depending upon the distances between the respective bearing slides 66, 67 and the spherical ball bearings 74 affixed to the frame 21. As the bearing slides 66, 67 move relative to the frame 21 along the X and Y coordinate axes, they also move the photomultiplier slides 64 and 65 which are respectively connected thereto. Thus the photomultiplier tubes 26 and 27 are positioned appropriately to receive light directed thereto from the respective light sources 39, 38 without undesirable distortion due to the movement of the scanner 20. Accordingly, an improved photomultiplier positioning mechanism is provided in accordance with the invention which positions the photomultiplier tubes 26 and 27 in relation to the positions of the scanner 20 without interruption or loss of the light beams incident upon the photomultiplier tubes 26, 27 due to the movement thereof.

In the fabrication of the photomultiplier positioning mechanism of the invention, particular care is taken to maintain the precise relationship in the mounting position of the respective components. The end brackets 54, the bearing slides 66, 67, and the photomultiplier slides 64, 65 are carefully aligned and held in fixed configuration in a special jig during the drilling of the respective holes for the X-axis guide rails 62, Y-axis guide rails 52 and the spacing rods 68. The appropriate ball bushings such as 55 are then inserted and the entire subassembly is put together on the guide rails 52 and 62. By fabricating the subassembly 50 in this fashion, a precision of manufacture to extremely close tolerances is achieved which enhances the effectiveness of the described arrangement in accordance with the invention.

Although there has been described above a specific arrangement of a photomultiplier positioning mechanism in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

1. In an optical system an apparatus for maintaining a pair of elements in a predetermined relationship with respect to a particular point on a carriage comprising:
a carriage movable in any one of three orthogonal directions,
means for mounting the elements on said carriage,
means for restraining the motion of the elements with respect to each other along a predetermined straight line parallel to one of said orthogonal directions,
a pair of pivot members,
a pair of extendable linkage members connecting the pivot members to the carriage, and
a pair of translating members for translating the rotational motion of the linkage members about the pivot members to a transverse movement of the elements with respect to each other along said line as the carriage is moved, whereby said pair of elements are aligned so that lines drawn from said elements parallel to said pair of extendable linkage members intersect at said particular point.

2. In an optical system the combination:
a carriage movable in any of three orthogonal directions,
a pair of elements mounted on said carriage and constrained to move in a first direction relative to each other and to move together in a second direction, said first and second directions defining a plane with respect to said carriage,
a pair of pivot points separate from the carriage,
a pair of pivot members rotatable about the pivot points, and
means for maintaining the two elements in line respectively with the extensions of said pivot members comprising:
parallel bar linkages coupled to the pivot members,
extendable linkage members arranged as a side of a corresponding bar linkage and connected to the carriage, and
means connecting the extendable members to said elements for converting the rotary motion of the pivot members to translational motion of said pair of elements relative to each other in said first direction.

3. A combination as set forth in claim 2 wherein said last mentioned means comprises a rod connected as part of an extendable member and fixed to rotate about a fulcrum point in said carriage,
a pair of guide rails mounted to said carriage and arranged to guide the motion of said elements therealong,
a pair of slidable elements movable along the guide rails on opposite sides of said elements,
a ball and socket connection affixing said rod to said slidable element, and
a spacing rod connecting each slidable member with the element adjacent the other slidable member in a fixed spacing relationship.

4. In an optical mapping system an apparatus for maintaining a pair of elements in line with respective pivot members corresponding to said elements comprising:
a carriage movable in any one of three orthogonal directions,
a pair of pivot members fixed in position at one end thereof,
telescoping linkage rods connecting said pivot members to said carriage,
respective pairs of orthogonally disposed guide rails defining a subassembly mounted to said carriage,
first slide members mounted on said guide rails and attached to an extension of said telescoping linkage rods,
second slide members mounted on said guide rails between said first slide members, and
means rigidly affixing said first slide members to said second slide members,
said means passing through an opening in one of said second slide members between the two first slide members to which it is affixed.

5. A photomultiplier positioning mechanism for use in the plotter of a stereomapping system comprising:
a pair of pivot members affixed at one end thereof to the frame of said plotter,
a scanner carriage movable vertically and horizontally over the bed of said plotter,
a pair of photomultiplier tubes, means for suspending said tubes for motion in a horizontal plane relative to the carriage in response to the movement thereof, said means being movable relative to each other in a first horizontal direction but constrained to move together in a second horizontal direction orthogonal to said first direction, and
means mechanically coupling the suspending means to the pivot members for controlling the position of said photomultiplier tubes in accordance with the angular displacement of said pivot members.

6. Apparatus in accordance with claim 5 wherein said pivot members comprise left-hand and right-hand members and
said photomultiplier tubes comprise left-hand and right-hand tubes,
the left-hand photomultiplier tube being controlled by the right-hand pivot member and the right-hand photomultiplier tube being controlled by the left-hand pivot member.

7. In an optical mapping system an apparatus for controlling the position of a pair of movable elements comprising:
a carriage movable in any one of three orthogonal directions,
a pair of pivot members each fixed in position at one end thereof,
a first pair of guide rails affixed to said carriage,
a pair of end brackets slidably mounted on said first guide rails,
a second pair of guide rails mounted in said brackets substantially orthogonal to said first guide rails,
a pair of movable slides mounted on said second guide rails and arranged for holding said elements, and
means connected to said slides and said pivot members for controlling the position of said elements in accordance with the angular displacement of said pivot members.

8. Apparatus in accordance with claim 7 wherein said means comprises a first bearing slide movably mounted on said second guide rails between one of said movable slides and one of said end brackets and
a second bearing slide movably mounted on said second guide rails between the other said movable slide and the other said end bracket, and
rigid connecting means between each bearing slide and the movable slide remote therefrom.

9. Apparatus in accordance with claim 8 wherein each said rigid connecting means is arranged to extend through an aperture in said movable slide adjacent the bearing slide to which it is connected.

10. Apparatus in accordance with claim 8 wherein said last mentioned means further includes telescoping linkage members rotatably attached to said bearing slides and connected to rotate with said pivot members.

11. Apparatus in accordance with claim 10 further including a rotatable mounting arranged to affix each linkage member to a corresponding portion of the frame of said carriage in order to provide a fulcrum for said linkage members.

References Cited by the Examiner
UNITED STATES PATENTS

| 2,833,178 | 5/1958  | Kelsh           | 88—20 X |
| 2,910,910 | 11/1959 | Rosenfeld et al. | 88—14   |
| 2,923,826 | 2/1960  | Bumley          | 250—201 |
| 3,004,464 | 10/1961 | Leighton et al. | 88—14   |

FOREIGN PATENTS

| 1,082,058 | 5/1960 | Germany. |

RALPH G. NILSON, *Primary Examiner.*